United States Patent [19]

Osakabe

[11] Patent Number: 5,477,293
[45] Date of Patent: Dec. 19, 1995

[54] CAMERA HAVING PICTURE PLANE SIZE SWITCHING MECHANISM

[75] Inventor: Kazunori Osakabe, Tokyo, Japan

[73] Assignee: ASAHI Kogaku Kogyo Kabushiki Kaisha, Tokyo, Japan

[21] Appl. No.: 187,513

[22] Filed: Jan. 28, 1994

[30] Foreign Application Priority Data

Feb. 1, 1993 [JP] Japan ................. 5-002246 U

[51] Int. Cl.$^6$ ................................. G03B 17/02
[52] U.S. Cl. ................................. 354/159
[58] Field of Search ..................... 354/159, 203

[56] References Cited

U.S. PATENT DOCUMENTS

| | | |
|---|---|---|
| 4,987,436 | 1/1991 | Misawa . |
| 5,325,140 | 6/1994 | Torikoshi et al. .............. 354/159 |
| 5,335,031 | 8/1994 | Ogawa ........................... 354/159 |
| 5,345,285 | 9/1994 | Hasushita et al. .............. 354/159 |
| 5,386,259 | 1/1995 | Ichikawa et al. .............. 354/159 |

FOREIGN PATENT DOCUMENTS 57-182725  11/1982  Japan .

*Primary Examiner*—David M. Gray
*Attorney, Agent, or Firm*—Sandler, Greenblum & Bernstein

[57] ABSTRACT

A camera having upper and lower guide rails for guiding a film and a photographing aperture provided between the upper and lower guide rails which defines an image area. A film cartridge compartment and film spool compartment are provided on opposite sides of the photographing aperture, and a mechanism for varying a size of the image area between a large size defined by The photographing aperture and a small size. The camera further includes a first element on which the guide rails and photographing aperture are located, and a second element on which the film cartridge compartment, the film spool compartment and an opening at least as large as the photographing aperture are located. The image area size varying mechanism is provided on the first or second element. The first and second element are secured to each other with the image area size varying mechanism positioned therebetween.

24 Claims, 5 Drawing Sheets

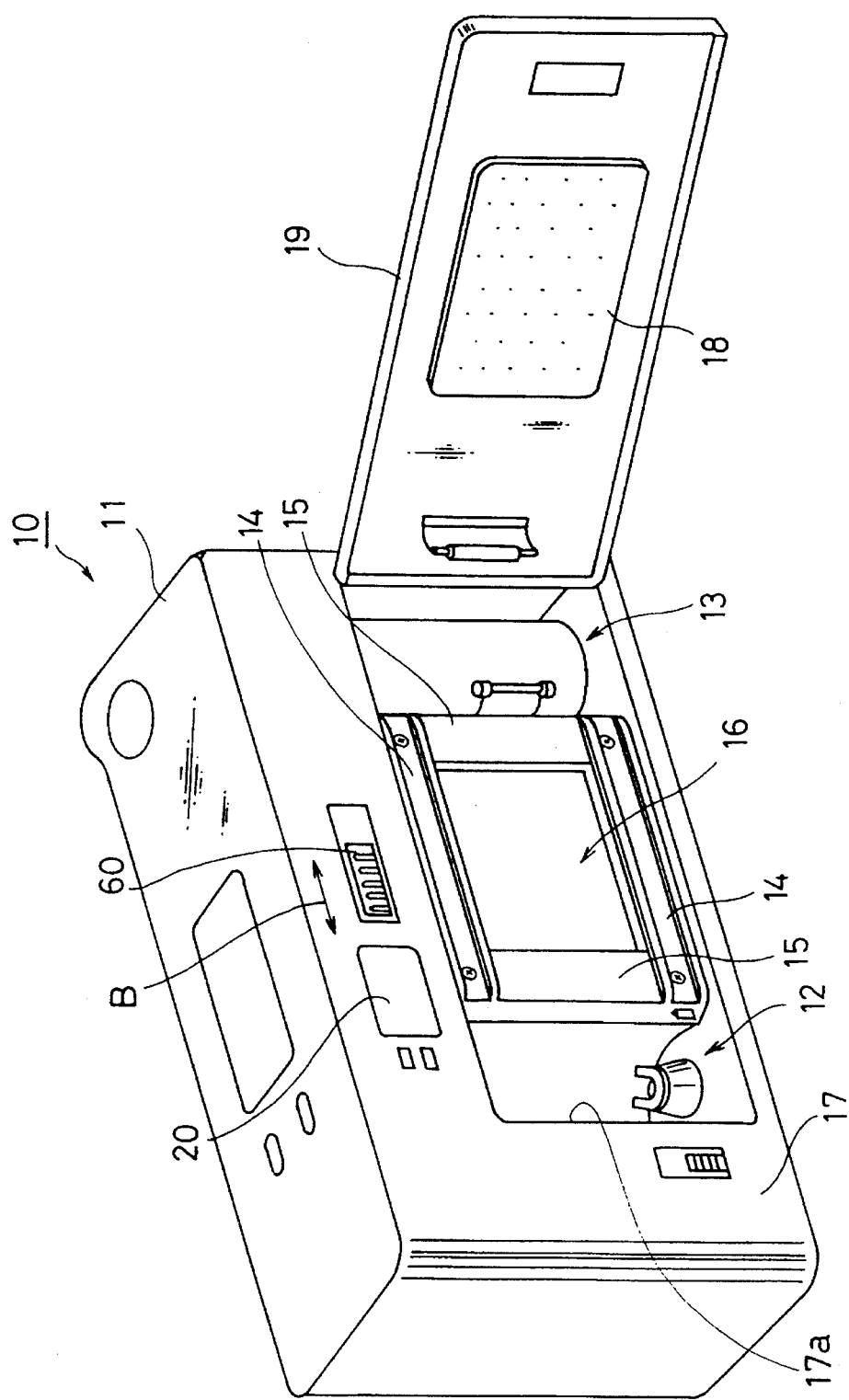

CAMERA HAVING PICTURE PLANE SIZE SWITCHING MECHANISM

BACKGROUND OF THE INVENTION

1. Field of the Invention

The present invention relates to a camera having an image area size varying mechanism which varies the size of an image area on a film.

2. Description of Related Art

In a known camera having an image area size varying mechanism, which can vary an image area size between at least two sizes, i.e., a large image area and a small image area, even after a film is loaded in the camera, the image area size varying mechanism is usually provided in front of an aperture frame (i.e., on an object side) which defines a photographing aperture within the camera body.

For example, Japanese Unexamined Patent Publication No. 57-182725 discloses a camera structure in which a film cartridge compartment and a film spool compartment are provided in protruding portions of the camera body that are located behind a photographing lens so as not to interfere with an object image forming optical path. This structure provides for a compact camera. In such a known camera structure as disclosed in JPP '725, the inner space of the camera body that is located closer to the photographing lens than the aperture frame is too narrow for the image area size varying mechanism to be accommodated in front of the aperture frame. In other words, in a camera having an image area size varying mechanism provided on the front side of the aperture frame nearest the photographing lens, it is, in practicality, very difficult to provide the protruding portions behind the photographing lens within the camera body without obstructing the image forming optical path.

SUMMARY OF THE INVENTION

The primary object of the present invention is to provide a camera having an image area size varying mechanism which will not hinder miniaturization of the camera.

To achieve the object mentioned above, according to the present invention, a camera is provided which has upper and lower guide rails for guiding a film and a photographing aperture which is provided between the upper and lower guide rails and which defines an image area. A film cartridge compartment and film spool compartment are provided on opposite sides of the photographing aperture. Also provided is a mechanism for varying a size of the image area between a large size defined by the photographing aperture and a small size. The camera further includes a first element on which the guide rails and photographing aperture are located, and a second element on which the film cartridge compartment, the film spool compartment and an opening at least as large as the photographing aperture are located. It is preferable that the image area size varying mechanism is provided on the first or second element. It is further preferable that the first and second elements are secured to each other with the image area size varying mechanism positioned therebetween.

According to another aspect of the present invention, a camera is provided which includes a first element having a photographing aperture and a second element, which is secured to the first element, having an opening corresponding to the photographing aperture. The camera further includes an image area size varying mechanism provided between the first and second elements. The image area size varying mechanism includes a pair of movable frame plates that are moved towards and away from one another to vary a size of the photographing aperture. The second element includes a pair of protruding portions which are provided on opposite sides of the opening and which define a film cartridge compartment in which a film cartridge is received and a film spool compartment in which a film winding spool is accommodated. Also provided are a mechanism for actuating the movable frame plates, a mechanism for functionally connecting the frame plates in a manner such that the frame plates move in association with one another, a mechanism for restricting the associated movement of the frame plates and a mechanism for retaining the frame plates in two different positions. The two different positions can correspond to a standard image area and a panoramic image area.

The present disclosure relates to subject matter contained in Japanese utility model application No. 05-2246 (filed on Feb. 1, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
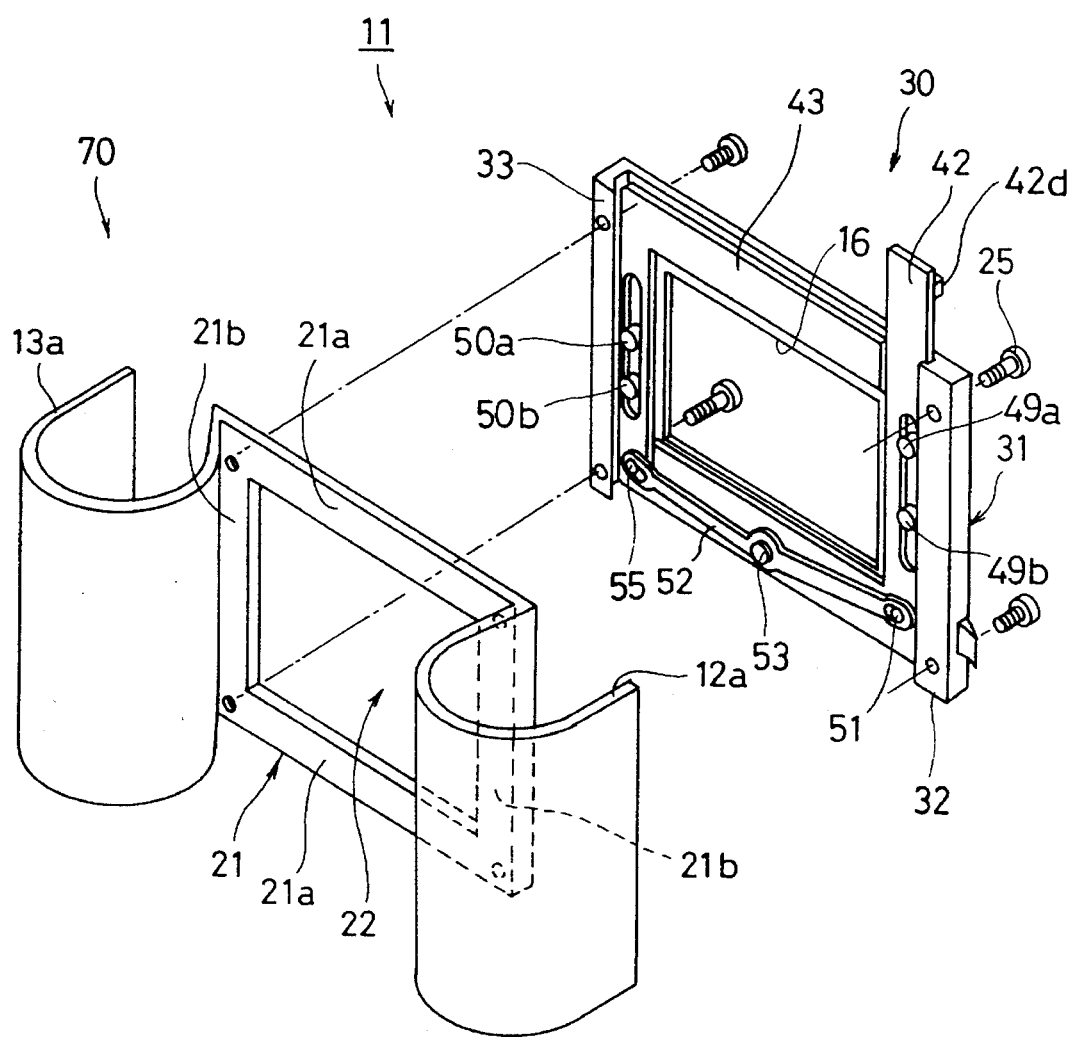
FIG. 1 is an exploded perspective view of a camera having a first element and a second element to which the first element is to be secured, according to the present invention.
Figure 2:
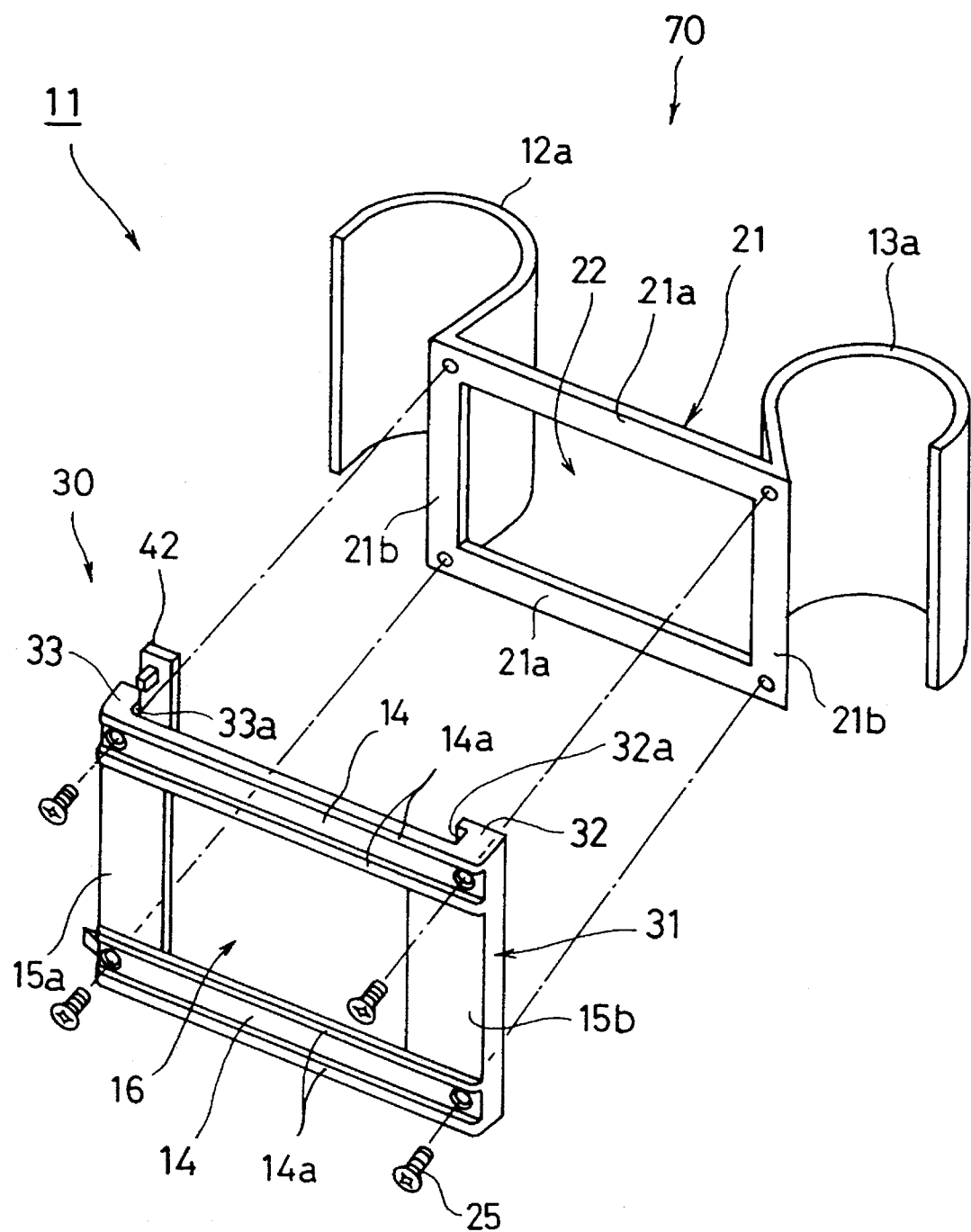
FIG. 2 is an exploded perspective view of a camera having a first element and a second element, as viewed in a different direction, according to the present invention.

With reference to FIG. 5, a camera 10 having an image area size varying mechanism, according to the present invention includes a camera body 11 which is provided therein with a first body (i.e., element or block) 30 and a second body (i.e., element or block) 70 (see also FIGS. 1 and 2).

The second body 70 is integrally provided with a curved side wall 12a which defines therein a patrone (i.e., film cartridge) compartment 12, a curved side wall 13a which defines therein a film spool compartment 13, and a connecting plate portion 21 which connects the curved side walls 12a and 13a. The second body 70 is secured to the camera body 11 at a predetermined position thereof. The connecting plate portion 21 includes a pair of upper and lower frame elements 21a, a pair of right and left frame elements 21b, and an opening 22 which is defined by the upper and lower frame elements 21a and the right and left frame elements 21b. The size of the rectangular opening 22 is equal to or larger than a photographing aperture 16 of the first body 30. The curved side walls 12a and 13a form bulged (i.e., protruded) portions that do not obstruct an image forming optical path of the camera between the photographing lens (not shown) and the film surface.

The first body 30 is provided with a frame member 31 which is comprised of a pair of upper and lower aperture frames 14 and a pair of right and left aperture frames 15. The frame member 31 has guide rails 14a provided on rear surfaces of the upper and lower aperture frames 14 (adjacent to the film) and consisting of outer and inner rails for guiding the film. The guide rails 14a extend between the patrone compartment 12 and the spool compartment 13. The frame member 31 is provided, on the front surface thereof adjacent to the photographing lens (not shown), with an image area size varying mechanism 40.

The aperture frames 15a and 15b of the first body 30 are provided on the surfaces thereof on the object side with guide walls (i.e., perpendicular projections) 32 and 33 that extend in the vertical direction in FIGS. 1 and 2. The first body 30 is secured to the second body 70 by means of machine screws 25, so that the surfaces of the guide walls 32 and 33 on the object side abut against the surfaces of the right and left aperture frames 21b of the second body 70 adjacent to the film. Consequently, the photographing aperture 16 of the first body 30 corresponds to the opening 22 of the second body 70. One of the most significant features of the present invention resides in the first body 30 being secured to the rear surface of the second body 70. Consequently, the patrone compartment 12 and the spool compartment 13 can be easily provided in the bulged state on opposite sides of the camera so as not to interfere with the image forming optical path. This reduces the lateral width of the camera body, thus resulting in a miniaturization of the camera 10.

The camera body 11 is provided on the rear surface 17 thereof with an opening 17a which is opened and closed by a back cover 19 which is provided with a film keeping plate 18. The rear surface 17 is also provided on an upper center portion thereof with a viewing window (i.e., finder ocular window) 20 for the view finder. An image area size varying knob 60 is provided on the right side of the viewing window 20 and is slid to select the image area size, for example, a standard size of 24 mm×36 mm or a panoramic size of 13 mm×36 mm.

The image area size varying mechanism 40 provided on the first body 30 will be discussed below.

Figure 3:
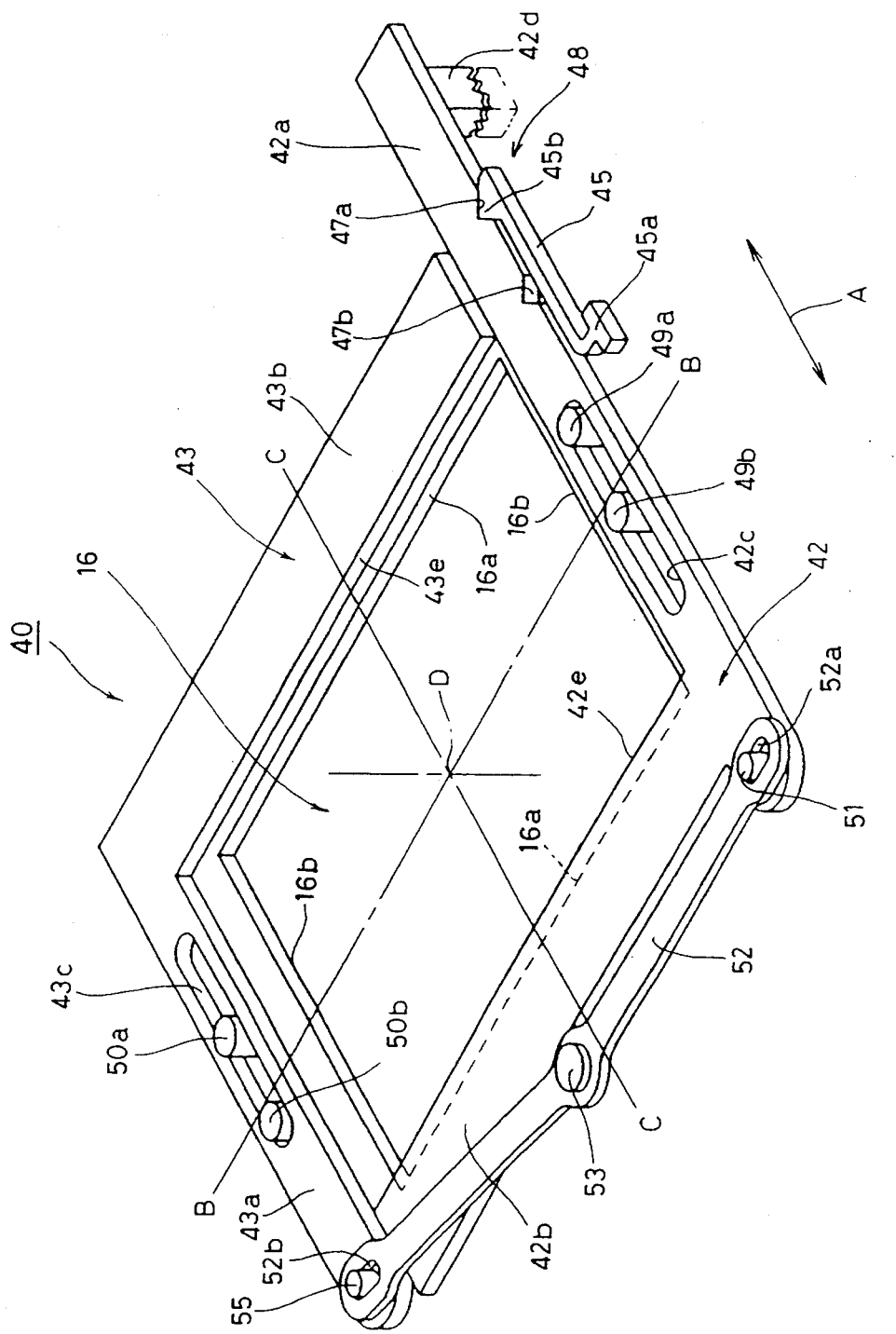
FIG. 3 is a perspective view of an image area varying mechanism in a position in which the image area size is enlarged.
Figure 4:
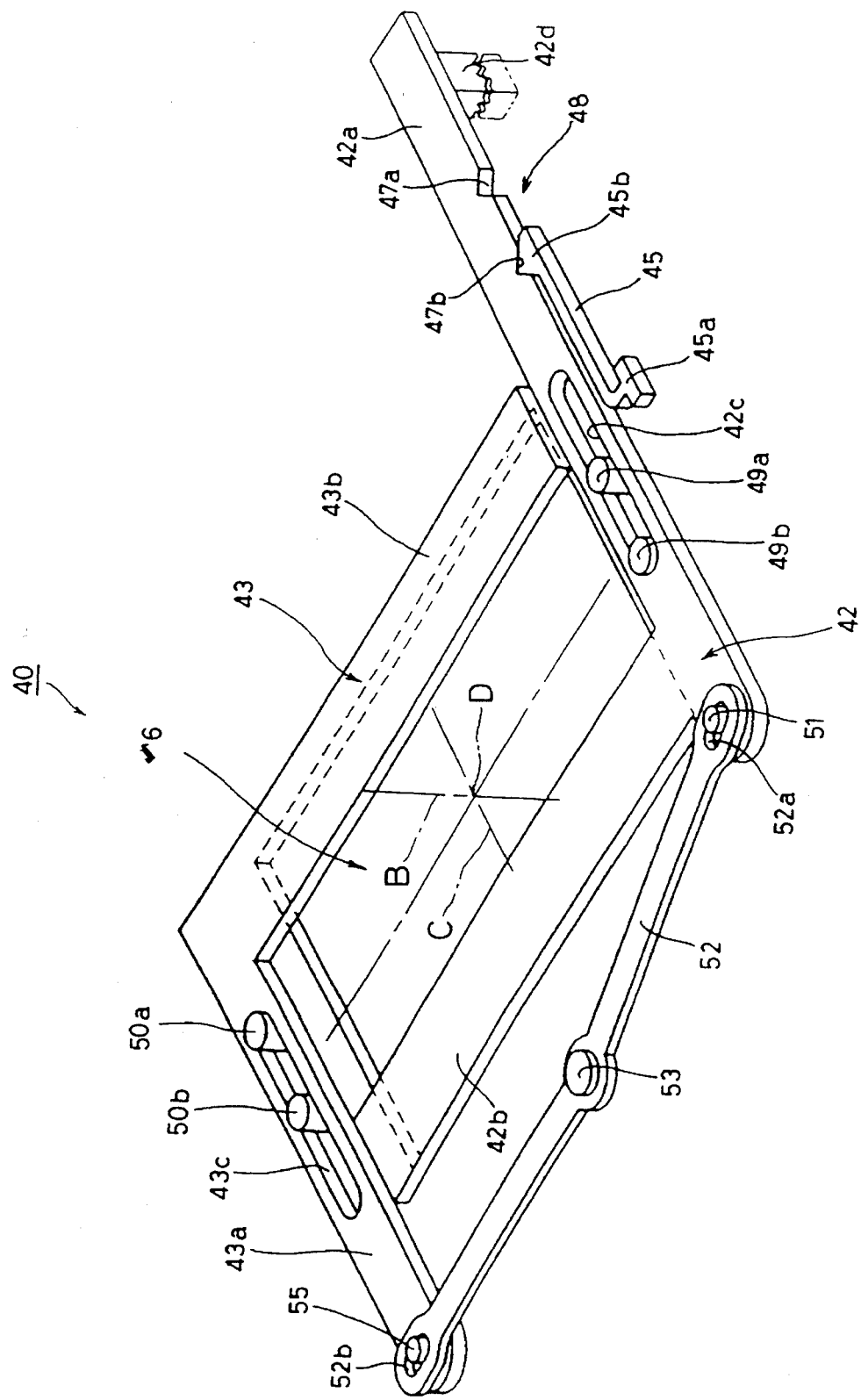
FIG. 4 is a perspective view of an image area size varying mechanism in a position in which the image area size is reduced; and, FIG. 5 is a perspective view of a back of a camera to which the present invention is applied.

As can be seen in FIGS. 1, 3 and 4, the image area size varying mechanism 40 provided on the frame member 31 to correspond to the photographing aperture 16 is comprised of a pair of generally L-shaped image area restricting plates 42 and 43. The first restricting plate 42 includes a guide portion 42a, an image area restricting portion 42b orthogonal to the guide portion 42a, and an operating portion 42d which projects from the back surface of the guide portion 42a. The second restricting plate 43 includes a guide portion 43a and an image area restricting portion 43b orthogonal to the guide portion 43a. The operating portion 42d is associated with the image area size switching knob 60 provided on the rear surface 17 of the camera body 11 through an association member (not shown), so that when the image area size switching knob 60 is slid in the direction "B" in FIG. 5, the operating portion 42d is moved in the direction "A" in FIG. 3.

The first size restricting plate 42 is provided on the guide portion 42a thereof with a linear guide groove 42c which extends in the direction of the length of the guide portion 42a. Two guide pins 49a and 49b, secured to the surface of the aperture frame 15 on the object side to be closer to the photographing aperture 16 than the guide wall 32, are fitted in the linear guide groove 42c. The guide pins 49a and 49b are spaced from one another at a predetermined distance in the longitudinal direction of elongated guide groove 42c. The first size restricting plate 42 is guided to move between the full size position (i.e., standard size) and the panoramic size position in the direction "A" in FIG. 3 of the photographing aperture 16 within the effective length of the elongated guide groove 42c through the engagement of the guide pins 49a and 49b in the elongated guide groove 42c. The clearance (i.e., tolerance) between the guide pins 49a and 49b and the elongated guide groove 42c is such that no inclination of the first size restricting plate 42 occurs during the movement thereof.

The first and second size restricting plates 42 and 43 are located in a substantially point-symmetrical arrangement with respect to an intersection point D of the orthogonal center lines B—B and C—C of the photographing aperture 16, as shown in FIG. 3, so that the opposed edges of the first and second size restricting plates 42 and 43 define the rectangular opening corresponding to the photographing aperture 16.

The second size restricting plate 43 is provided on the guide portion 43a thereof with a linear guide groove 43c which extends in the direction of the length of the guide portion 43a. Two guide pins 50a and 50b, secured to the surface of the aperture frame 15 on the object side to be closer to the photographing aperture 16 than the guide wall 32, are fitted in the linear guide groove 43c. The guide pins 50a and 50b are spaced from one another at a predetermined distance in the longitudinal direction of elongated guide groove 43c. The second size restricting plate 43 is guided to move between the full size position (i.e., standard size) and the panoramic size position in the direction "A" in FIG. 3 of the photographing aperture 16 within the effective length of the elongated guide groove 43c through the engagement of the guide pins 50a and 50b in the elongated guide groove 43c. The clearance between the guide pins 50a and 50b and the elongated guide groove 43c is such that no inclination of the second size restricting plate 43 occurs during the movement thereof, similar to the first size restricting plate 42.

The first size restricting plate 42 has a supporting pin 51 at an intersection of the guide portion 42a and the image area restricting portion 42b, and the second size restricting plate 43 has a supporting pin 55 at a front end of the guide portion 43a, respectively. The supporting pins 51 and 55 are fitted in elongated holes 52a and 52b formed at opposite ends of an association bar (i.e., lever) 52, respectively. The association bar 52 is rotatably pivoted to the frame member 31 substantially at the center thereof through a pivot pin 53 secured to the frame member 31. Consequently, when the first image area restricting plate 42 is moved from the full size position shown in FIG. 3 towards the panoramic size position (i.e., in the upward direction along the center line C—C in FIG. 3), the association bar 52 is rotated about the pivot pin 53 in the counterclockwise direction, so that the second image area restricting plate 43 can be moved into the panoramic size position (i.e., in the downward direction along the center line C—C in FIG. 3). Conversely, when the first image area restricting plate 42 is moved from the panoramic size position towards the full size (i.e., standard size) position (i.e., in the downward direction along the center line C—C in FIG. 3), the association bar 52 is rotated about the pivot pin 53 in the clockwise direction, so that the second image area restricting plate 43 can be moved into the standard size position.

In the illustrated embodiment, the guide walls 32 and 33 are provided on the opposite side surfaces thereof with vertical grooves 32a and 33a in which the guide portions 42a and 43a of the first and second image area restricting plates 42 and 43 are slidably fitted, respectively. Consequently, the first and second image area restricting plates 42 and 43 are prevented from being disengaged from the guide pins 49 (49a, 49b) and 50 (50a and 50b) before the first and second bodies 30 and 70 are interconnected (i.e., assembled).

The association bar 52 has a substantially symmetrical shape with respect to the pivot pin 53, namely, the length of the portion of the association bar 52 between the pivot pin 53 and the supporting pin 51 is substantially identical to the length of the portion of the association bar 52 between the pivot pin 53 and the supporting pin 55, so that the movement of the first image area restricting plate 42 causes the second image area restricting plate 43 to move by the same displacement in the opposite direction with respect to the center line B—B of the photographing aperture 16.

The first size restricting plate 42 is provided, on the outer side surface of the guide portion 42a thereof, with first and second engaging recesses 47a and 47b which are spaced at a predetermined distance in the direction of the length of the guide portion 42a. The frame member 31 is provided with a click spring 45 that is secured to the guide wall 32 at one end 45a thereof. The click spring 45 has an engaging pawl 45b at the free end thereof and is elastically deformable, so that the engaging pawl 45b can be engaged in the notch 47a or 47b. The engaging notches 47a, 47b and the click spring 45 constitute a click stop mechanism 48 which retains the image area restricting plates 42 and 43 in the full size position or the panoramic size position. The distance between the first and second engaging notches 47a and 47b is such that when the pawl 47b of the click spring 45 is engaged in the notch 47a or 47b, the image area restricting plates 42 and 43 are located in the 35 mm full size position or the panoramic size position.

Namely, when the pawl 47b is engaged in the first notch 47a, the image area restricting plates 42 and 43 are located in the 35 mm full size position shown in FIG. 3; and when the pawl 47b is engaged in the second notch 47b, the image area restricting plates 42 and 43 are located in the panoramic size position (i.e., small size) shown in FIG. 4 in which the size restricting portions 42b and 43b are moved close to each other to cover the upper and lower edges of the photographing aperture 16 thereby reducing the size of the photographing aperture 16.

The image area size switching mechanism 40 operates as follows.

Upon taking a picture at a 35 mm full size, the image area size varying knob 60 which is associated with the operating portion 42d is manually actuated to move the first image area restricting plate 42 in the direction parallel with the center line C—C (FIG. 3) until the pawl 45b engages in the first engaging notch 47a.

Consequently, the upward and downward movement of the first image area restricting plate 42 is transmitted to the association bar 52 through the supporting pin 51, so that the association bar 52 is rotated about the pivot pin 53 in the clockwise direction in FIG. 3. Consequently, the rotation of the association bar 52 causes the second image area restricting plate 43 to linearly move in the upward and downward direction parallel with the center line C—C in FIG. 3. Namely, the second image area restricting plate 43 is moved by the same displacement as that of the first image area restricting plate 42 in the opposite direction with respect to the center line B—B in FIG. 3. Consequently, a 35 mm size image area is defined by the inner side edges of the image area restricting portions 42b and 43b and the right and left side edges of the photographing aperture 16, as shown in FIG. 3.

Upon taking a picture at a panoramic size, the image area size varying knob (i.e., switch) 60 is manually actuated to a panoramic size position. Consequently, the first image area restricting plate 42 is moved from the 35 mm full size position in the upward direction parallel with the center line C—C (FIG. 3) until the pawl 45b engages in the second engaging notch 47b.

Consequently, the upward movement of the first image area restricting plate 42 is transmitted to the association bar 52 through the supporting pin 51, so that the association bar 52 is rotated about the pivot pin 53 in the counterclockwise direction in FIG. 3. Consequently, the rotation of the association bar 52 causes the second image area restricting plate 43 to linearly move by the same displacement as that of the first image area restricting plate 42 in the opposite direction with respect to the center line B—B in FIG. 3. As a result, a panoramic size image area is defined by the inner side edges of the image area restricting portions 42b and 43b and the right and left side edges of the photographing aperture 16, as shown in FIG. 4.

Although the image area size varying mechanism 40 is provided on the first body 30 in the illustrated embodiment, it is alternatively possible to provide the image area size varying mechanism 40 on the second body 70. In this alternative, the guide walls 32, 33 and the guide pins 49a, 49b, 50a and 50b are provided on the right and left frame elements 21b of the connecting plate portion 21 of the second body 70.

The present invention is not limited to the illustrated embodiment (the illustrated image area size varying mechanism 40).

As can be seen from the foregoing, according to the present invention, there is provided the first body which has guide rails, the photographing aperture, and the image area size varying mechanism, and the second body which has the patrone compartment, the spool compartment and the opening identical to or larger than the photographing aperture of the first body, the first body being secured to the rear surface of the second body. Accordingly, to realize a small and compact camera, the bulged portions for the patrone compartment and the spool compartment can be easily formed behind the photographing lens so as not to interfere with the image forming optical path. Consequently, an image area size varying mechanism which does not hinder the miniaturization of the camera can be obtained.

I claim:

1. A camera having upper and lower guide rails for guiding a film, a photographing aperture which is provided between the upper and lower guide rails and which defines an image area, a film cartridge compartment and film spool compartment provided on opposite sides of said photographing aperture, and a mechanism for varying a size of said image area between a large size defined by said photographing aperture and a small size, comprising:

a first element that includes said guide rails and defines said photographing aperture; and, a second element that includes said film cartridge compartment, said film spool compartment, and an opening at least as large as said photographing aperture;

wherein said image area size varying mechanism is provided on one of said first element and said second element; and, wherein said first element and said second element are secured to each other with said image area size varying mechanism positioned between said first element and said second element.

2. The camera of claim 1, wherein said image area varying mechanism is provided on a surface of said first element.

3. The camera of claim 1, wherein said image area varying mechanism is provided on a surface of said second element.

4. The camera of claim 1, wherein said first element includes a frame portion which defines said photographing aperture, and wherein said image area size varying mechanism is provided on a surface of said frame portion that is located adjacent to said second element.

5. The camera of claim 4, wherein a surface of said frame portion that is located opposite to said second element is provided with said film guide rails.

6. The camera of claim 5, wherein said image area size varying mechanism includes a pair of image area restricting plates that are moved towards and away from each other in a direction parallel to said frame portion and perpendicular to a photographing lens optical axis.

7. The camera of claim 6, further comprising:
a lever which functionally connects said image area restricting plates in a manner such that said image area restricting plates move in opposite directions.

8. The camera of claim 7, wherein said image area restricting plates partly intercept upper and lower portions of said photographing aperture when said image area restricting plates are moved towards each other, and wherein said image area restricting plates are moved out of said photographing aperture when said image area restricting plates are moved away from one another.

9. The camera of claim 7, wherein said frame portion is provided with vertical guiding surfaces which are perpendicular to said image area restricting plates and which are in contact with said second element, thereby defining a space between said first and second elements in which said image area restricting plates are received.

10. The camera of claim 9, wherein said second element includes a pair of curved surfaces that define said film cartridge compartment and said film spool compartment, respectively, and a connecting portion which connects said curved surfaces, said opening being provided on said connecting portion.

11. The camera of claim 10, wherein said curved surfaces protrude from said second element on opposite sides of said optical path.

12. A camera comprising:
a camera body which includes a first element having a photographing aperture and a second element which is secured to said first element and which has an opening corresponding to said photographic aperture, said first element and said second element being secured against relative movement with respect to each other; and
an image area size varying mechanism provided between said first and second elements, said image area size varying mechanism including a pair of movable frame plates that are moved towards and away from one another to vary a size of said photographing aperture.

13. The camera of claim 12, wherein said second element includes a pair of protruding portions which are provided on opposite sides of said opening and which define a film cartridge compartment in which a film cartridge is received and a film spool compartment in which a film winding spool is accommodated.

14. The camera of claim 13, further comprising:
means for actuating said movable frame plates.

15. The camera of claim 14, further comprising:
means for functionally connecting said frame plates in a manner such that said frame plates move in association with one another.

16. The camera of claim 15, further comprising:
means for restricting said associated movement of said frame plates.

17. The camera of claim 16, further comprising:
means for retaining said frame plates in two different positions.

18. The camera of claim 17, wherein said two different positions correspond to a standard image area and a panoramic image area.

19. The camera of claim 12, wherein said first and second elements are secured to said camera body.

20. The camera of claim 12, further comprising a pivotable arm coupling said pair of movable frame plates for image area size varying movement.

21. The camera of claim 12, further comprising:
a resilient member; and
one of said pair of movable frames having a plurality of notches at predetermined locations for selectively receiving said resilient member to retain said pair of movable frames in predetermined positions.

22. The camera of claim 12, said image area varying mechanism further comprising:
means for moving one of said pair of movable frame plates; and
means for transmitting motion of said one of said pair of movable frame plates to another of said pair of movable frame plates.

23. A camera, comprising:
a camera body housing having first and second elements;
said first element having a photographic aperture;
said second element having an opening corresponding to said photographic aperture, said first element and said second element being positioned along an optical axis of the camera; and
an image varying device having first and second frames, disposed between said first and second elements, at least one of said first and second frames being movable independently of both said first and second elements to vary a size of said photographic aperture.

24. The camera according to claim 23, wherein said first and second frames are "L" shaped frames.

* * * * *